United States Patent [19]
Wittliff

[11] Patent Number: 5,431,237
[45] Date of Patent: Jul. 11, 1995

[54] WELL FLUID AND METHOD OF MAKING

[75] Inventor: James R. Wittliff, Lufkin, Tex.

[73] Assignee: Bottom Line Industries, Inc., Lafayette, La.

[21] Appl. No.: 335,087

[22] Filed: Nov. 7, 1994

Related U.S. Application Data

[63] Continuation of Ser. No. 57,111, May 4, 1993, Pat. No. 5,363,928, which is a continuation-in-part of Ser. No. 877,473, May 1, 1992, abandoned.

[51] Int. Cl.$^6$ .................... E21B 33/138; C09K 7/02
[52] U.S. Cl. ................................. 175/72; 507/104
[58] Field of Search ................. 175/65, 72; 507/104

[56] References Cited

U.S. PATENT DOCUMENTS

| | | | |
|---|---|---|---|
| 3,629,102 | 12/1971 | Lummus et al. | 252/8.5 LC |
| 4,082,677 | 4/1978 | Zollar et al. | 252/8.5 B |
| 4,247,403 | 1/1981 | Foley et al. | 252/8.5 LC |
| 4,289,632 | 9/1981 | Clear | 252/8.5 LC |
| 4,629,575 | 12/1986 | Weibel | 252/8.551 |
| 5,004,553 | 4/1991 | House et al. | 252/8.51 |
| 5,071,575 | 12/1991 | House et al. | 252/8.551 X |
| 5,118,664 | 6/1992 | Burts, Jr. | 507/104 |

*Primary Examiner*—Ramon S. Britts
*Assistant Examiner*—Frank S. Tsay
*Attorney, Agent, or Firm*—Gilbreth & Adler

[57] ABSTRACT

A by-product of corn is utilized in the drilling fluid while drilling boreholes to reduce friction and to reduce the normal adverse effects inherent in each drilling fluid.

12 Claims, No Drawings

WELL FLUID AND METHOD OF MAKING

This application is a continuation of U.S. patent application Ser. No. 08/057,111, filed May 4, 1993, now issued as U.S. Pat. No. 5,363,928, which is a continuation-in-part of U.S. patent application Ser. No. 07/877,473, filed May 1, 1992, now abandonded.

SUMMARY OF THE INVENTION

A portion of corncobs known as bees wings to those in the granular processing industry are used extensively for consumption by animals. Bees wings are added selectively to drilling fluid which may be either water-based or oil-based. The bees wings are ground to a powder-like material and added to the drilling fluid in a quantity ranging from one pound to forty pounds per barrel of fluid used in drilling. Adverse chemical effects on the borehole are minimized and friction on the drillpipe also is reduced through the material and method of the present invention. The exact particle size and amount of material will be determined by the applicable well conditions including the type of subterranean formations being drilled.

DETAILED DESCRIPTION

During drilling of wells, drilling fluid or mud is used to circulate and remove foreign matter from the borehole and to allow easier rotation of the drillpipe thereby minimizing power necessary to rotate the drillpipe and allowing faster drilling of tile borehole than requiring use of the drilling rig for shorter period of time and consequently less expense. Many drilling fluids have an adverse chemical effect on the formations encountered in drilling thereby providing undesirable chemical reactions in the borehole.

Corncobs comprise four principle parts that are arranged concentrically. The center portion is very light density pith core, that is surrounded by a woody ring, that in turn is surrounded by a coarse chaff portion, that in turn is covered by a fine chaff portion. The coarse and fine chaff portions form the sockets for anchoring the corn kernels to the corncob. The normal methods of grinding corncobs produce a mixture of all four parts enumerated above. It is possible, however, to separate the woody ring material from the remainder of the cob. The portion of the corncob remains after removal of the woody ring material is known as bees wings.

It is known in the drilling industry to use ground whole corncobs or the woody ring material to prevent lost circulation. U.S. Pat. No. 4,247,403, issued to the Foley et al clearly describes that process. However, it has been the practice in the drilling industry to discard the bees wings as being detrimental to the drilling process because the addition of ground whole corncobs causes a frequently undesirable increase in the yield point of drilling muds while the addition of only the woody portion does not appreciably increase the yield point of the drilling mud.

Another problem encountered in the drilling industry apart from lost circulation is the loss of fluid from the drilling mud. The distinction between lost circulation and fluid loss is very important. In the situation commonly referred to as lost circulation, the entirety of the drilling mud, or whole mud, seeps into large sand formations and cavities. When this occurs, more of the frequently expensive drilling mud must be introduced to carry drill shavings to the surface. It is desirable to avoid further loss of whole mud by use of additives that plug the sands and cavities. Typically the additives used for the purpose are large particles relative to the size of particles used as fluid loss additives.

In the situation commonly referred to as fluid loss, only the fluid portion of the drilling mud leaches into the formations, leaving the non-fluid portions in the bore hole. As this occurs, a filter cake forms which, if allowed to build, often results in the drill pipe becoming stuck. This problem completely stops the drilling operation and may lead to abandonment of the well prior to completion. Therefore, fluid loss may be a more critical problem than lost circulation. Because of the differing problems and the lack of options that will effectively prevent fluid loss without an undesirable resultant filter cake, avoiding an increase to the yield point of the drilling mud is less of a concern for fluid loss additives than for lost circulation additives.

Several methods have been used in the drilling industry to prevent fluid loss including the use of ground walnut shells, pecan shells and peanut hulls to create a filter cake at the strata where fluid in the form of filtrate from drilling mud has been lost. U.S. Pat. No. 5,076,944 issued to Cowan describes the use of cotton burrs as a drilling mud additive to prevent fluid loss. U.S. Pat. No. 5,087,611 issued to Forrest describes the use of peanut hulls as a drilling mud additive to prevent fluid loss.

In the present invention bees wings are added to the drilling mud. Bees wings intrude into the pores of the strata to prevent fluid loss without a resultant filter cake build up. The lack of a resultant filter cake build up is a substantial advantage over the methods previously utilized. The bees wings may then be acidized when it is desirable to open the strata for production.

Bees wings are ground to a powder material, placed in containers, and hauled to the well site where such material is added to the drilling fluid in a quantity of about one pound to forty pounds per barrel of drilling fluid. The exact chemical reaction of the drilling fluid additive is not known but increased efficiency in the drilling rate and decreased adverse chemical reaction is provided.

Among the advantages in using the present invention are:
(1) Reduces well cake permeability
(2) Seals off depleted sands and micro fractures
(3) Prevents seepage loss and stuck pipe
(4) Makes casing and logging run smooth
(5) Bio degradable and non-toxic
(6) Temperature is stable
(7) Reduces bit balling, drag, and torque
(8) Reduces shale and gumbo problems The present invention is used underground and not on the surface of the earth.

Thus, the present invention provides a compound, method, and system for improving drilling fluid.

Although a preferred embodiment of the invention has been described, it will be appreciated by those skilled in the art to which the present invention pertains that modifications, changes, and improvements may be made without departing from the spirit of the invention defined by the claims. For example, without limitation as to other modification, changes, and improvements it may be desirable to premix the bees wings with about two percent (2%) by weight of the drilling mud base, typically oil or water, prior to addition of the mixture to drilling mud.

What is claimed:

1. A method of carrying Out oil well drilling operations wherein a drilling fluid is circulated in a well being drilled in the ground comprising the steps of:
   taking bees wings and grinding said bees wings to a powder form,
   adding said ground bees wings to a drilling fluid, and
   circulating said drilling fluid, with said ground bees wings added thereto, in said well while drilling operations are being carried out.

2. A well fluid comprising a drilling fluid and ground bees wings.

3. The well fluid of claim 2 wherein the ground bees wings are present in an amount of at least about one pound per barrel of drilling fluid.

4. The well fluid of claim 2 wherein the ground bees wings are present in an amount from about one pound to about forty pounds per barrel of drilling fluid.

5. The well fluid of claim 2 further comprising a drilling mud base.

6. The well fluid of claim 5 wherein the drilling mud base is water or oil.

7. The well fluid of claim 5 wherein the drilling mud base is present at about 2 weight percent, based on the weight of the drilling mud base and the ground bees wings.

8. A method of making a well circulation fluid comprising contacting a drilling fluid and ground bees wings.

9. The method of claim 8 wherein the ground bees wings are present in an amount from about one pound to about forty pounds per barrel of drilling fluid.

10. The method of claim 8 wherein the ground bees wings are present in an amount of at least about one pound per barrel of drilling fluid.

11. The method of claim 8 further comprising contacting the drilling fluid and the ground bees wings with a drilling fluid base.

12. The method of claim 11 wherein the drilling fluid base is oil or water.

* * * * *